United States Patent Office 3,434,242
Patented Mar. 25, 1969

3,434,242
MACHINE TOOL
Jan Micheal Corey, 838 S. Coleman, Mesa, Ariz. 85201
Filed Mar. 31, 1967, Ser. No. 627,503
Int. Cl. B24b 5/08, 3/46; F16h 9/00
U.S. Cl. 51—34                                     12 Claims

ABSTRACT OF THE DISCLOSURE

A machine tool wherein a honing device or other tool is mounted on a reciprocating carriage and moved relative to work held by the frame of the machine, the carriage being reciprocated by reversible mechanism comprising a pair of clutches engageable with oppositely rotating shafts and wherein limit devices at opposite ends of the stroke of the carriage alternately operate the clutches to reverse movement of the carriage at each opposite end of its stroke; and wherein means is provided to cooperate with said limit devices for causing a time delayed dwell at various positions of the stroke of said carriage.

BACKGROUND OF THE INVENTION

This invention relates to a machine tool and more particularly to a machine tool for honing the bores of cylinders or the like.

In conventional machine tools and particularly those devoted to the honing of cylinders, it has been a problem economically to hone the bores of worn cylinders particularly those which have become substantially barrel shaped wherein an intermediate portion of the bore is of a larger diameter than the opposite ends thereof.

Various prior art machines are quite complicated and expensive and further these machines require a particular mode of operation when honing such worn cylinders so as to impose a substantial labor cost which in many instances is not economically feasible.

SUMMARY OF THE INVENTION

The machine of the present invention employs a very simple machine tool carriage actuating mechanism which is capable of reciprocatory movement and very rapid reversals in direction of movement at opposite ends of the stroke of the carriage as well as means for conveniently programming dwell operation of the carriage at various stroke positions thereof, thereby enabling the operator of the machine to program its operation efficiency to remove diametrically uneven portions in a worn cylinder bore with a minimum of attention by the operator.

Accordingly it is an object of the invention to provide a honing machine which very efficiently and accurately straightens the bores of worn cylinders.

Another object of the invention is to provide a machine comprising a reciprocating carriage having novel means for actuating it, all of which may be applicable to use in a variety of machine tools.

Another object of the invention is to provide a machine having novel carriage reversing clutch and limit switch mechanism which promotes accurate dwell programming of the carriage operation of the machine so that cylinder bores or other structures of uneven dimensions may readily be honed to desired tolerances and dimensions by programming the machine to devote more honing time to some areas of the work than others.

Further objects and advantages of the invention may be apparent from the following specification, appended claims and accompanying drawings.

DESCRIPTION OF THE PREFERRED EMBODIMENTS

Figure 1:
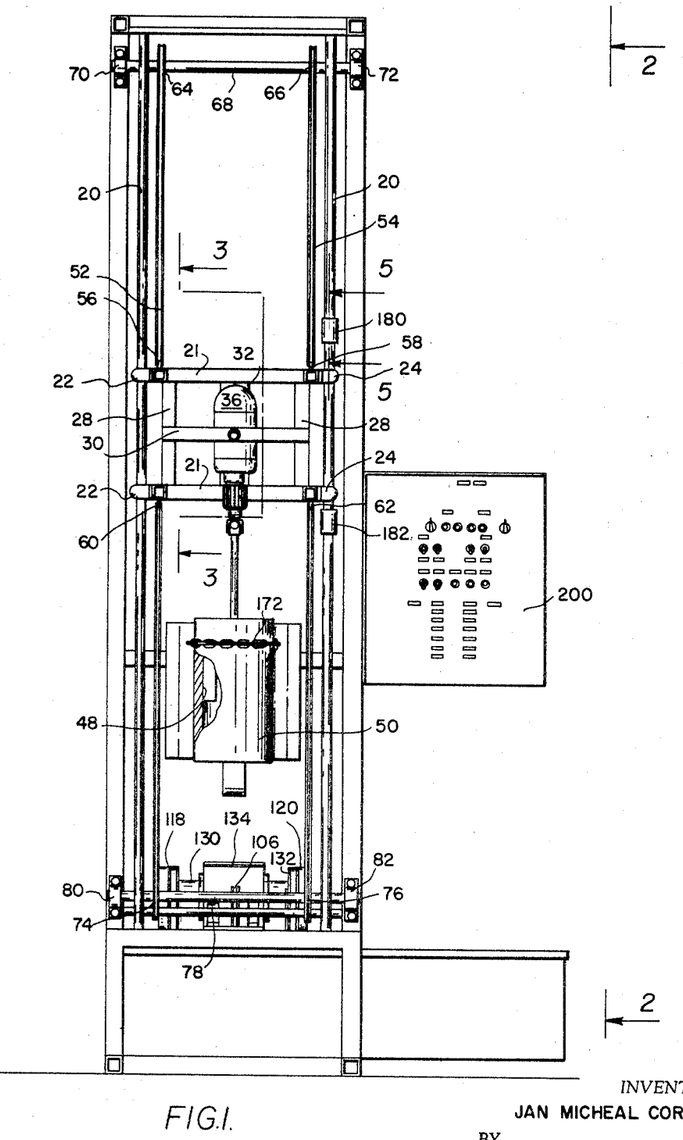
FIG. 1 is a front elevational view of a honing machine in accordance with the present invention.
Figure 2:
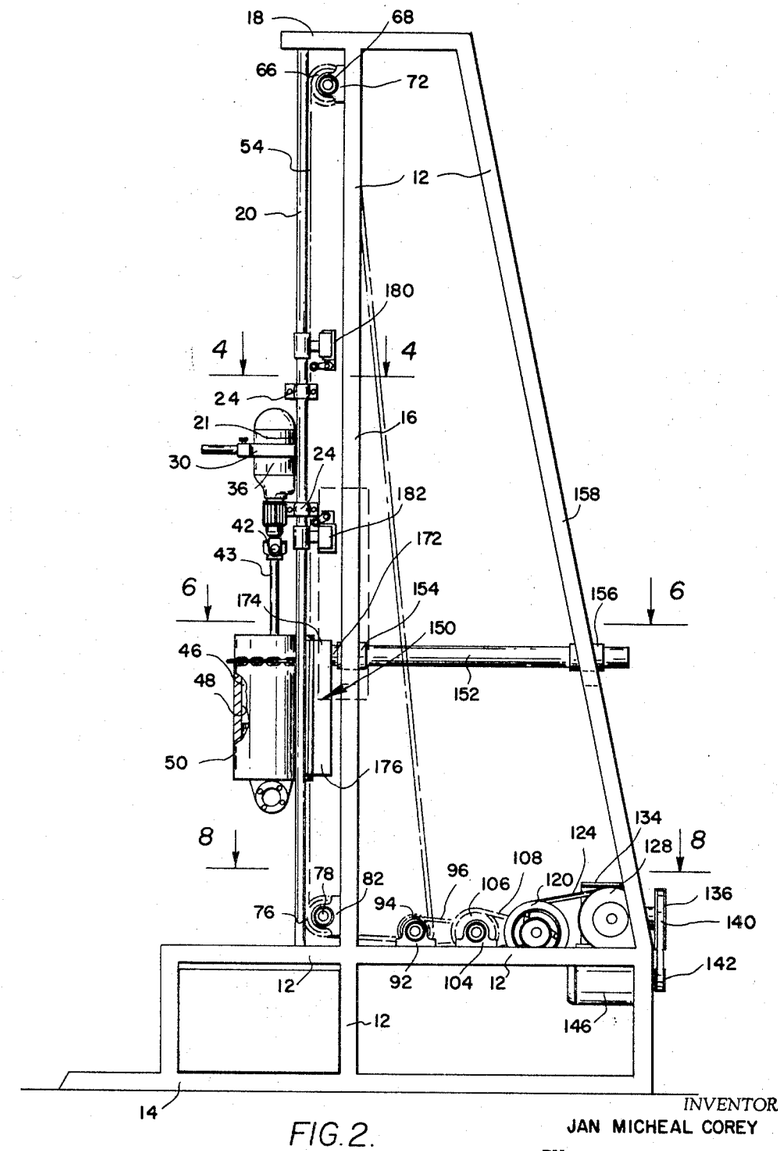
FIG. 2 is a side elevational view of the honing machine of the invention taken from the line 2—2 of FIG. 1, but showing a control panel of the machine in broken line to facilitate the illustration.
Figure 8:
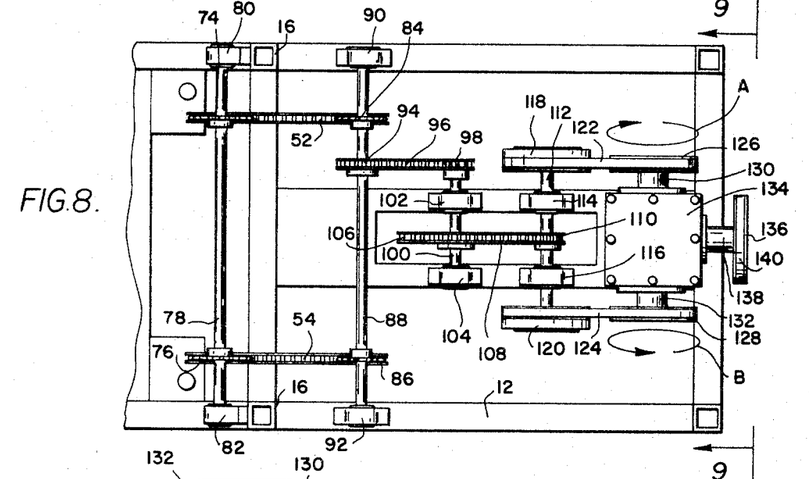
FIG. 8 is an enlarged fragmentary plan sectional view taken from the line 8—8 of FIG. 2.

As shown in FIGURES 1, 2 and 8 of the drawings, the machine of the invention is provided with a frame 12 having a base portion 14 and a generally vertical portion 16, the vertical portion 16 being secured to a substantially horizontal portion 18 at the uppermost portion of the frame. Disposed between the uppermost portion 18 and the base portion 12 are a pair of carriage guide bars 20 which support the tool carriage of the machine to move in a rectilinear reciprocating action relative to the frame such that the carriage moves back and forth in an up and down relation to the frame.

The carriage 21 is provided with a pair of slide bearings 22 slidably mounted longitudinally on one of the bars 20. The carriage 21 is also provided with another pair of similar slide bearings 24, slidable longitudinally upon the other of the vertical bars 20. The bearings 22 and 24 are interconnected by horizontal bars 26 of the carriage 21. Interconnecting these horizontal bars are vertical bars 28 between which is secured a motor mount 30. In addition to the motor mount 30, a vertical bar 32 interconnects the horizontal bars 26. Secured to the vertical bar 32 is a plate 34 on which the motor 36 is mounted so as to provide a secured support for the motor 36 on the carriage 21.

The motor 36 is provided with tool chuck 38 holding a shaft 40 having a pair of universal joints 42 and 44 connected therewith. A hone assembly 46, of conventional construction, is coupled to the universal joint 44, and this hone 46 is adapted for use in honing an internal bore portion 48 of a cylinder 50, shown held to a work holding means on the main frame of the machine of the invention as will hereinafter be described in detail.

Secured to the uppermost crossbar 26 of the frame 21, are a pair of chains 52 and 54; these chains 52 and 54 are provided with respective ends 56 and 58 connected directly to the carriage 21 while opposite ends 60 and 62 of the chains 52 and 54 are connected to the lowermost crossbar 26 of the frame 21.

Figure 9:
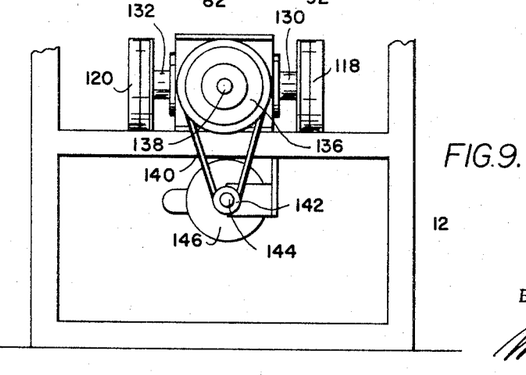
FIG. 9 is a fragmentary rear view of drive mechanism of the machine taken from the line 9—9 of FIG. 8.

The chains 52 and 54 are thus endless in their connection with the carriage 21, and pass over respective idler sprockets 64 and 66 on a shaft 68 journaled in bearings 70 and 72 at the upper portion of the frame 12. The chains 52 and 54 pass over respective idler sprockets 74 and 76 on a shaft 78 mounted in bearings 80 and 82 secured to a lowermost portion of the frame 12. The chains 52 and 54 also, as shown in FIGURES 2 and 9, pass over respective drive sprockets 84 and 86 mounted on a shaft 88 carried in bearings 90 and 92 supported on the base portion of the frame 12. Thus the sprockets 84 and 86 drive the chains 52 and 54 as will be hereinafter described in detail.

Coupled to the shaft 88 is a drive sprocket 94 engaged by a chain 96 driven by a sprocket 98. The sprocket 98 is mounted on the shaft 100 which is journaled in bearings 102 and 104 mounted on the frame 12. Carried by the shaft 100 and secured thereto is a sprocket 106 driven by a chain 108, which passes over a sprocket 110, mounted on a shaft 112, which is journaled in bearings 114 and 116 mounted on the frame 12. Secured on opposite ends of the shaft 112 are a pair of electro-magnetic clutches 118 and 120 engaged by belts 122 and 124 respectively. These belts 122 and 124 are driven by pulleys 126 and 128 respectively, mounted on respective shafts 130 and 132 projecting from a gear box 134. The shafts 130 and 132 operate in opposite rotary directions as indicated by arrows A and B in FIGURE 8 of the drawings. The gear box 134 is driven by a pulley 136 mounted on an input shaft 130 of the gearbox 134. Engaged on the pulley 136 is a belt 140 which also engages a pulley 142 on a shaft 144 of an electric motor 146. All is shown best in FIGS. 8 and 9 of the drawings.

Figures 6, 7:
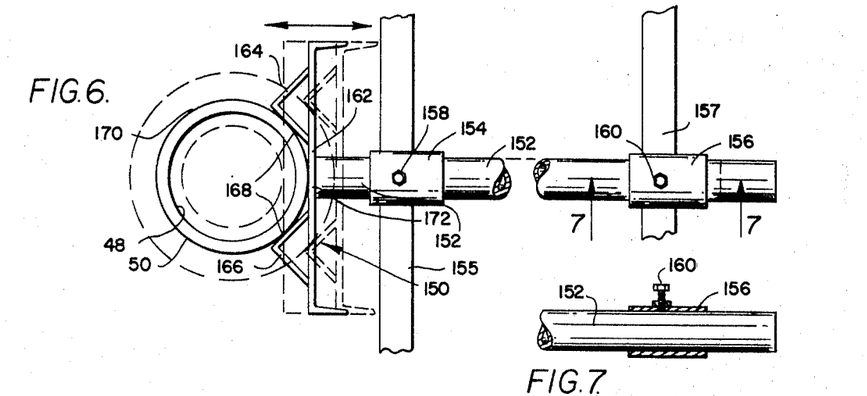
FIG. 6 is an enlarged fragmentary plan sectional view taken from the line 6—6 of FIG. 2.
FIG. 7 is a fragmentary sectional view taken from the line 7—7 of FIG. 6 showing parts in elevation to facilitate the illustration.

The machine of the invention is provided with a work holder means 150 shown best in FIGS. 1, 2 and 6 of the drawings. This work holder 150 is provided with a horizontal bar 152 mounted in a pair of spaced supporting sleeves 154 and 156 secured to cross members 155 and 157 secured to respective uprights 16 and 158 of the frame 12. These sleeves 154 and 156 are preferably circular in cross-section, hollow, tubular members and are provided with respective set screws 158 and 160 adapted to clamp the bar 152 therein. This bar 152 is preferably circular in cross-section, tubular member having one end thereof fixed to a work holder frame 162. This frame 162 may be a channel member as shown, or any other suitable rigid structure. Secured to the channel member are a pair of angle members 164 and 166, they are secured by welding or otherwise on the channel member 162 such that the corners project away from the channel member and form a pair of converging surfaces 168 which converge toward the holder member 162 such that the periphery 170 of a cylinder 50 as shown in FIGS. 1, 2 and 6, may be cradled between the converging surfaces 168 of the angles 164 and 166 or to the work holder frame 152 may be tightened by a suitable screw or other means for holding the periphery 170 of the cylinder 50 firmly against the converging surfaces 168 of the angle members 164 and 166.

The bar 152 being adjustably mounted in the sleeves 154 and 156, permits adjustment of the work holder 162 and the bore 48 of the cylinder 50 so that it may be aligned substantially vertically with the axis of the motor 36 and its chuck 38 so as to permit the hone 46 to be driven back and forth in the bore 48.

It will be understood that the universal joints 42 and 44 at opposite ends of the shaft 43 compensate for any slight misalignment between the rotating axis of the chuck 38 and the driven axis of the hone assembly 46. Thus the cylinder to be honed may be set up in substantial alignment with the axis of the motor 36 and then the set screws 158 and 160 may be set to retain the bar 152 substantially in a precise location.

It will be seen from FIG. 2 of the drawings that the bar 152 is connected to the work holder frame 162 at a location 172 which is near an upper end 174 of the work holder frame 150, thus permitting a lower end 176 to hang below the bar 152 and when the set screws 158 and 160 are in loose position, gravity will tend to align the angle members 168 in a substantially vertical disposition to provide for substantial axial alignment of the cylinder 58 with the shaft 43 and the axis of the motor 36. It will therefore be appreciated that the work holder 150 may be adjusted quite accurately, laterally of the axis of the cylinder bore 48, and that the axis of the cylinder bore 48 may be aligned substantially vertically by the simple expedient of gravity acting about the axis of the bar 52 before the set screws 158 and 160 are set. In this manner a very simple setup is made for substantial alignment of the bore 48 with the motor 36 and compensation for any slight misalignment is provided for by the universal joints 42 and 44 which couple the hone assembly 46 with the chuck 38 of the motor 36.

Mounted on one of the carriage slide bars 20 of the frame 12, are a pair of limit switch assemblies designated L–1 and L–2. These assemblies are shown in detail in FIG. 5 where in each assembly, L–1 and L–2, is provided with a hollow cylindrical mount sleeve 186 which is slidably mounted on a respective bar 20, and fixed thereon by a set screw 188. Thus the assemblies L–1 and L–2 may be located in various spaced relationship vertically on the respective bar 20, in accordance with the length of the bore 48 of the cylinder 50 which it is desired to hone.

The assembly L–1 is substantially identical to the assembly L–2 but operable in a different direction.

Figures 3, 5:
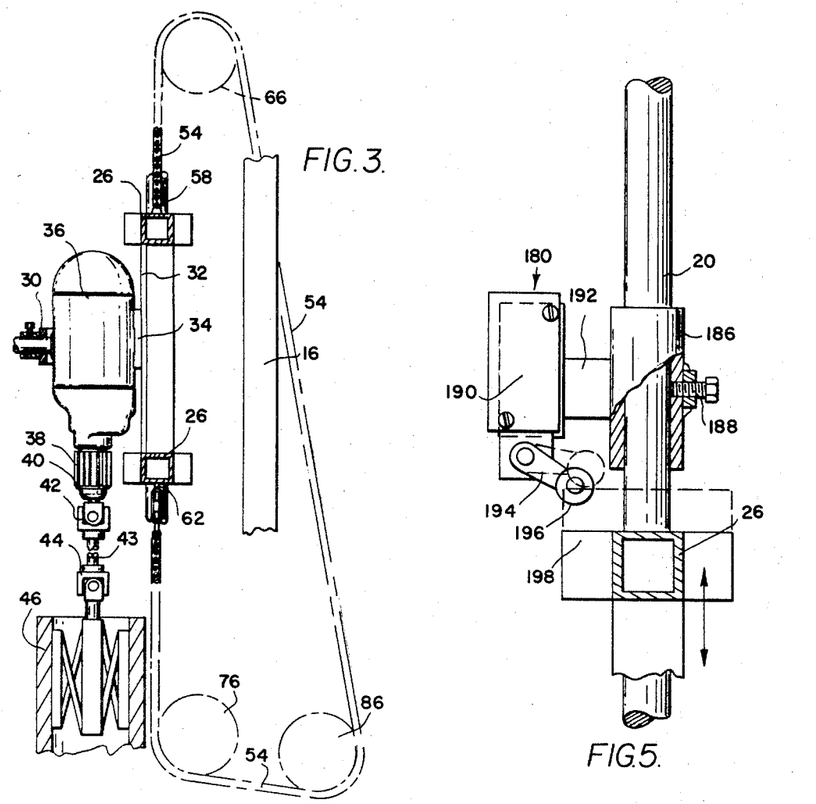
FIG. 3 is an enlarged fragmentary sectional view taken from the line 3—3 of FIG. 1.
FIG. 5 is an enlarged fragmentary sectional view taken from the line 5—5 of FIG. 1 showing parts and portions in elevation to facilitate the illustration.
Figure 4:
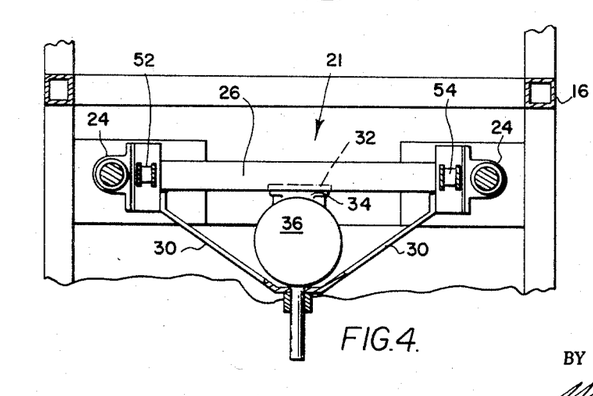
FIG. 4 is an enlarged fragmentary plan sectional view taken from the line 4—4 of FIG. 2.

As shown in FIG. 5, the limit switch assembly L–1, is provided with a limit switch mechanism 190 coupled to the sleeve 186 by means of an extended bracket 192. The limit switch is provided with a pivoted arm 194 operable to actuate the switch, and this arm carries a contact roller 196 which is contacted by a projecting portion 198 on the uppermost carriage cross member 26, while a similar arrangement is provided to actuate the limit switch assembly L–1. These limit switch assemblies L–1 and L–2, being vertically adjustable on the guide bar 20, control rectilinear reciprocatory movement of the carriage 21 and the hone drive motor 36. The limit switches L–1 and L–2 are in electrical circuit with the electro-magnetically operable clutch mechanisms 118 and 120, so that these switches influence operation alternately of these clutches 118 and 120 to reverse actuating movement of the carriage 21 in connection with the chains 52 and 54 and the drive mechanism hereinbefore described.

DESCRIPTION OF THE MACHINE FUNCTION AND CONTROL ELEMENTS

The present invention includes a method of programming reciprocation of a honing machine for automatic removal of taper or barrel shapes from the inside of a cylinder, accomplished through dwelling the reciprocation of the hone through a preselected duration of dwell at the top or bottom or both ends of the honing stroke, each independently of the other. Also a means is provided for selecting the number of times the honing tool will dwell at the top or bottom of the hone stroke or both each independently of the other and then automatically reverting back to a conventional stroke. Additionally means are provided for the stroke dwelling to be accomplished during every stroke or on alternate strokes at the top or the bottom of the stroke or both, each independently of the other.

The programming of the aforementioned sequences can be readily changed at any time, even during the honing stroke. Programming is accomplished through various types of switches on a panel 200, shown in FIG. 1, conveniently located to the machine operator.

The reciprocation of this honing machine is accomplished through the hereinbefore described mechanical drive train and electro-magnetic clutches which provides an almost instantaneous reversal and a linear rate of travel for the carriage, depending on the programming of the electronic devices on the control panel.

The drive motor 146, for the reciprocation of the hone carriage is of an universal AC/DC type, incorporating brushes. This motor's speed and consequently the reciprocation rate of the hone is controlled through a motor speed control of the silicon controlled rectifier type. As can readily be seen this gives an infinitely variable reciprocation rate of the hone within limits determined by the motor's speed range and gear ratio between motor and carriage. The controls for the motor are in the panel 200. The reciprocation rate of the hone can be readily changed at any time, even during operation.

The motor 36, used for the rotational drive of the honing tool, is of the universal AC/DC type incorporating brushes. This motor's speed is governed by a motor speed control such as a silicon controlled rectifier; the controls for which are on the panel 200. As can be readily seen this motor control provides for an infinitely variable rotational rate of the honing tool 46 throughout the speed range of the motor. The rotational rate of honing tool can be changed at any time, even during operation of the machine.

There is also incorporated in the control panel 200, an amp gauge A–1 which has a large face plate and pointer, so as to produce a long sweep of the pointer between graduations, resulting in an accurate reading as compared to a smaller dial and pointer. This amp gauge is connected to the hone rotation drive motor 36.

It is a well known fact that the amperage used by a universal motor will increase as the work load is increased and the amperage used by the motor will decrease as the motor's work load decreases.

The work load of the hone drive motor 36 is determined by the pressure, exerted by the abrasive stones of the honing tool 46 against the cylinder bore wall 48, which is readily adjusted by the operator.

If the work load of the hone drive motor is thus adjusted so as to bring the mean of the amperage drawn to the area of mid scale of the amp gauge A–1; the amp gauge will then accurately show any change in work load of the hone drive motor.

The amp gauge A–1 is used by the operator as a measuring instrument to determine whether or not the cylinder being honed has any deviations in its diameter such as tapered or barrel shapes, which would result in an increase or decrease in the work load of the honing tool drive motor 36.

By using the above method the operator does not have to stop the honing machine of the invention and use the conventional methods of measurement to determine if the cylinder walls are concentric and parallel.

The above described method is surprisingly accurate; as for example: with the particular components used in the present machine it has been determined that one amp of deviation from the mean, drawn by the motor 36, may equal two thousandths of an inch difference in a cylinder's diameter.

After the operator establishes a material removal rate, the hone 48, for example, based on type of material, the honing tool's rotational speed and reciprocation rate and type of stones used, the operator can then program the machine to dwell the honing tool in the necessary areas of the cylinder wall 48 as indicated by the amp gauge A–1.

Accordingly the machine of the invention will produce a cylindrical and parallel wall surface in a cylinder in a very rapid, convenient and economical manner.

The following portion of the specification contains abbreviation characters which designate specific components of the invention as follows:

T–D–1 and T–D–2 are time delay relays;
S–T–1 and S–T–2 are stepping relays;
S–E–L–1 and S–E–L–2 are wafer switches;
R designates a relay;
L–1 and L–2 are limit switches;
M–1 is a motor;
M–S–C–1 and M–S–C–2 are motor speed controls;
S–5, S–6, P–B–1, P–B–2, and P–B–3 are momentary circuit making push button switches;
S–9 is a momentary circuit breaking push button switch;
1–S–S–1, S–2, S–3, S–7, and S–8 designate toggle switches;
M–S–1 designates toggle switch;
S–1 and S–4 are toggle switches;
A–1 is an amp gauge.

(Electrical operational sequence for conventional stroke without dwell.)

Figure 10:
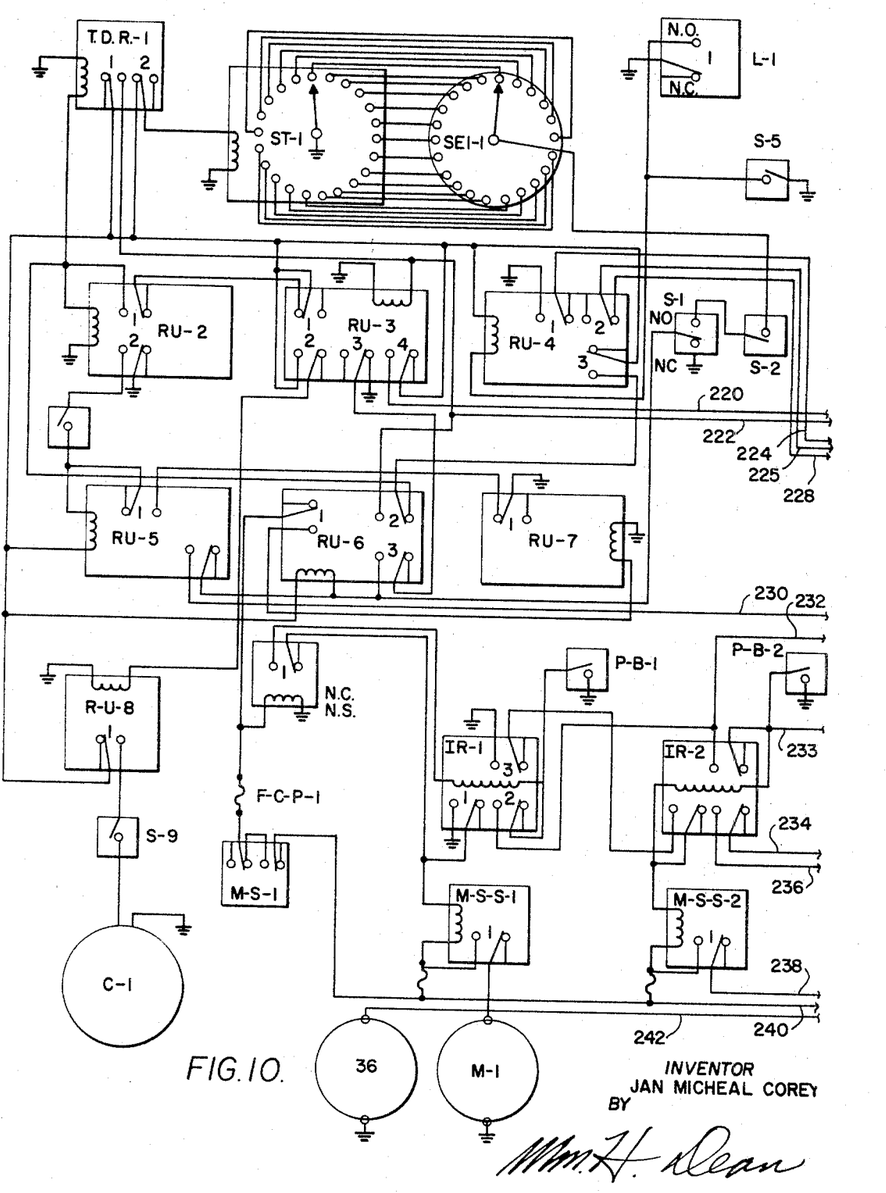
FIG. 10 is a view showing diagrammatically electronic and control equipment of the invention.
Figure 11:
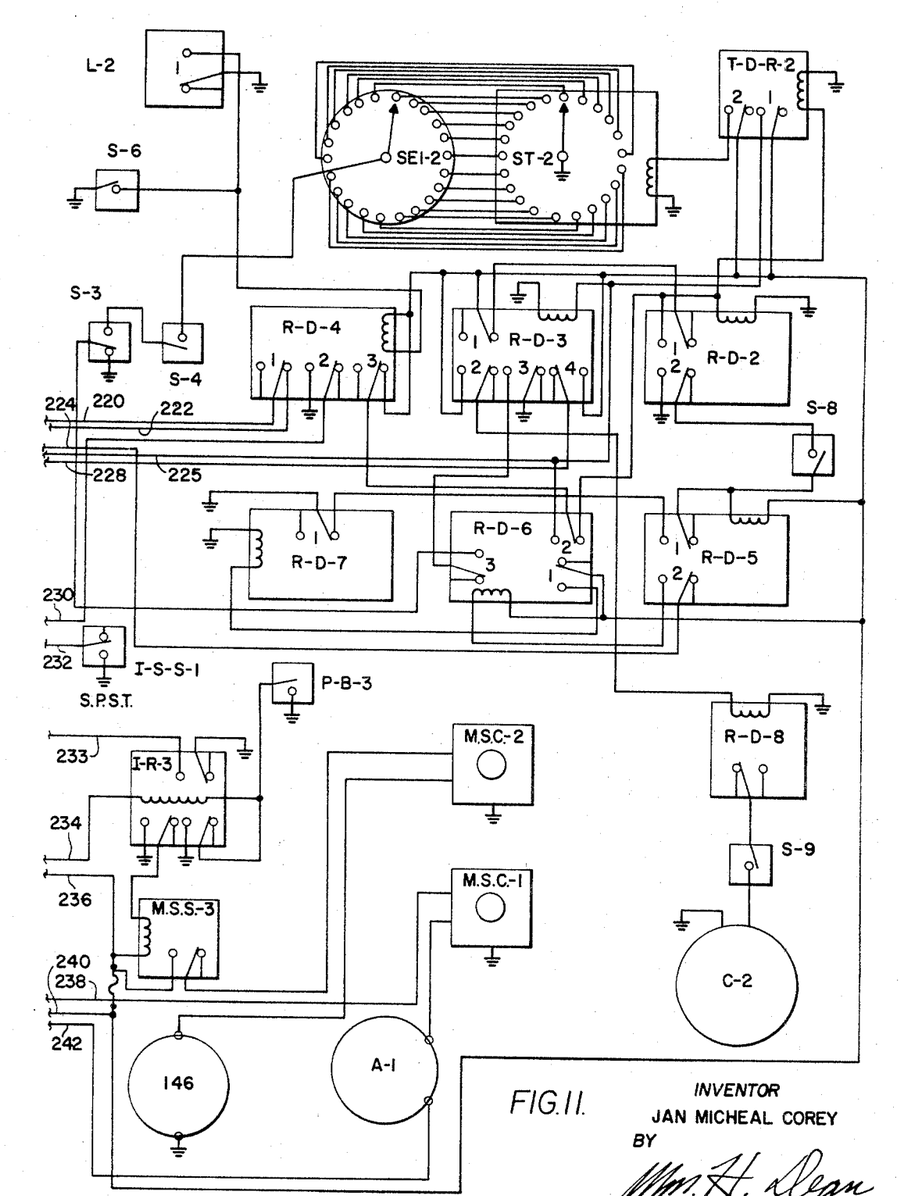
FIG. 11 is a view similar to FIG. 10, but showing the remainder of the electronic and control equipment of the invention which is not illustrated in FIG. 10.

Referring to FIGS. 10 and 11, M–S–1 is closed by the operator thereby applying power to the control panel 200. 1–S–S–1 interlock toggle safety switch is then closed to ground by the operator.

P–B–1 is then momentarily closed to ground by the operator which will energize 1–R–1 and close the normally open contacts No. 2 thereof to ground through 1–S–S–1, which will cause it to lock itself closed. Also contacts No. 1 of 1–S–S–1 are then closed to ground energizing the coil of M–S–S–1 which close the normally open contacts No. 1 thereof which will start the coolant pump motor M–1. Also normally open contacts No. 3 of 1–R–1 are then closed which has no effect at this time.

P–B–2 is also momentarily closed to ground by the operator energizing the holding coil of 1–R–2 which will close the normally open contacts No. 3 thereof, to ground through 1–S–S–1 which will lock 1–R–2 in its energized position. Also normally open contacts No. 1 of 1–R–2 when closed will allow M–S–S–2 to be energized through normally open contacts No. 3 of 1–R–1 which have been closed previously. Normally open contacts of M–S–S–2 are closed which activates M–S–C–1 starting the hone rotating motor 36. Also normally open contacts No. 2 of 1–R–2 are closed which does nothing at this time.

P–B–3 is momentarily closed to ground by the operator energizing the holding coil of 1–R–3 through contacts No. 2 of 1–R–2. Normally open contacts No. 2 of 1–R–3 are closed to ground causing 1–R–3 to lock in the energized position. Normally open contacts No. 1 of 1–R–3 have closed which energized the holding coil of M–S–S–3 which closes the normally open contacts No. 1 of M–S–S–3 which activates M–S–S–2 thereby starting the reciprocation motor 146 while 1–R–3's normally open contacts No. 3 have been closed to ground.

As can readily be seen by the aforementioned operational sequence and accompanying schematic, two goals have been achieved. One is that the motors 36 and 146 have to be started in the proper sequence, coolant before hone rotation, and hone rotation before stroke, in that order or they will not remain activated. As can also be seen the operator can override the interlock system by the use of the momentary switches provided, should he desire.

After the three motors have been started the machine safety switch 1–S–S–1 can be opened from ground by the operator so, that should any of the following fuses F–C–P–1 or F–M–1 or F–M–2 or F–M–3 blow, the respective motors will be deactivated through the aforementioned interlock system.

S–1 may be closed to ground by the operator energizing R–U–6. S–4 may be closed to ground by the operator energizing R–D–6. If the carriage is contacting either L–1 or L–2 the machine will begin to reciprocate. If the carriage is not contacting either L–1 or L–2, the operator will have to momentarily close S–5 which will start the carriage travel upward or he may momentarily close S–6 which will start carriage travel downward after which the machine will begin automatic reciprocation.

Operation section—A

Reference is now made to the electrical operational sequence beginning with the carriage contacting roller 196 of L–1. Normally open contacts No. 1 of L–1 are closed to ground which will energize R–U–4. Normally open contacts No. 3 of R–U–4 are closed which will energize the holding coil of R–U–3 through normally open contacts No. 2 of R–U–6 which have been closed previously by S–1. Normally open contacts No. 4 of R–U–3 have closed completing the interlocking circuit through normally closed contacts No. 1 of R–D–4 to holding coil of R–U–3. R–U–3 will remain engaged even after the carriage 21 travels way from L–1 breaking L–1's contacts from ground which will release R–U–4 which has no effect at this time.

Normally open contacts No. 2 of R–U–3 are closed completing the circuit to the holding coil of R–U–8 thereby closing the normally open contacts No. 1 of R–U–8 which will activate the electric clutch 120 which is rotating in such a manner as to drive the home carriage 21 downward away from L–1 and towards L–2. The carriage will continue to travel in this direction until it contacts L–2.

Operation section—B

When the carriage completes its downward travel, the normally open contacts of L–2 will close which will engage the holding coil of R–D–4. Normally closed contacts No. 1 of R–D–4 are then opened which will release the holding coil of R–U–3. Normally open contacts No. 2 of R–U–3 are now open which will release the holding coil of R–U–8 which will open the normally open contacts No. 1 of R–U–8 and disengage the electric clutch 120, which will stop driving the carriage any further towards L–2. Normally open contacts No. 3 of R–D–4 are closed which completes a circuit through normally open contacts No. 2 of R–D–6 (which have been closed previously by S–4), to the holding coil of R–D–3. Normally open contacts No. 4 of R–D–3 will close completing the interlocking circuit through normally closed contacts No. 2 of R–U–4 so that R–D–3 will remain engaged even after the carriage 21 has traveled away from L–2 opening its normally open contacts from ground.

Normally open contacts No. 2 of R–D–3 have closed which will energize holding coil of R–D–8 which will close normally the open contacts No. 1 of R–D–8 which will cause the electric clutch 118 to engage and to drive the carriage 21 away from L–2 and toward L–1. The carriage 21 will continue to travel in this direction until it contacts L–1 and close the normally open contacts No. 1 thereof to ground which will energize the holding coil of R–U–4 which will break the normally closed contacts No. 2 thereof which will release the holding coil of R–D–3 which will open the normally open contacts No. 2 thereof which will release the holding coil of R–D–8 thereof opening the normally open contacts No. 1 thereof which will release the electric clutch 118 so as not to drive the carriage any further towards L–1. The carriage has thus traveled one complete stroke, and has restarted the operation sequence in (operation section—A).

In accordance with the above electrical operation sequences (sections A and B) and the accompanying schematic, the reciprocation of the carriage 21 will continue in this manner for an infinite number of times or until the operation selects a different stroke pattern.

There is also incorporated in the electrical circuits, provisions for the dwelling of the carriage 21 and hone 46 in selected areas of the stroke travel, so as to allow the honing tool to remove more material from some areas of the cylinder than others, so as to be able to compensate for undesirable shapes in a cylinder, such as tapered or barrel wear patterns in old cylinders or poor machining in new cylinders, and it is to be understood that these or other shapes that can be accomplished through dwelling of the hone can also be induced into the cylinder, should they be desired.

Operation section—C

An electrical operational sequency for dwell at a lowest position of carriage travel, is as follows: S–7 is placed in closed position, S–1 is placed in neutral position (open). S–4 is closed to ground with the carriage 21 contacting L–1. L–1's normally open contacts No. 1 are closed, energizing the holding coil of R–U–4 which closes its normally open contacts No. 3, which completes a circuit through normally closed contacts No. 2 of R–U–6 to the holding coil of R–U–2 and T–D–R–1, starting a time delay upon energization thereof. Normally open contacts No. 2 of R–U–2 have closed to ground, which energizes the holding of R–U–5. Normally open contacts of R–U–5 are closed, which completes a circuit through normally closed contacts No. 1 of R–U–7 to ground so as to keep R–U–5 energized even after normally open contacts No. 2 of R–R–2 open at a later time. Normally open contacts No. 1 of R–U–2 are closed keeping holding coils of R–U–2 and T–D–R–1 energized even though L–1 may open due to vibration or moving of the carriage 21 slightly away from L–1 during a dwell operation. After T–D–R–1 has completed its delay, the length of which can be readily set by the operator, the normally open contacts No. 1 thereof will close momentarily, which will energize the holding coil of R–U–3, which will open the normally closed contacts No. 1 of R–U–3 which will open the circuit of R–U–2 and T–D–R–1, which will open the normally open contacts No. 2 of R–U–2, which has no effect at this time.

Accordingly, neither of the electrical clutches 118 or 120 have been engaged, and consequently the carriage has remained at a standstill, allowing the hone to remove material from a respective area of the cylinder bore 48.

After the energization of R–U–3, the electrical and mechanical equipment will perform, as described in OPERATION SECTION—A.

Operation section—D

After completion of OPERATION SECTION—A, and when the carriage 21 contacts L–2, operation is as follows:

Normally open contacts No. 1 of L–2 having been closed, will energize the holding coil of R–D–4, which will close the normally open contacts No. 2 of R–D–4 to ground completing the circuit through normally open contacts No. 3 of R–U–5, which have been closed by a previous operation, which will energize the holding coil of R–U–6 which will close the normally open contacts No. 3 of R–U–6, which will lock the holding coil of R–U–6 through the normally closed contacts No. 3 of R–U–3.

Contacts No. 1 of R–U–6 having been closed, will energize the holding coil of R–U–7, which will open the normally closed contacts No. 1 of R–U–7, which will release the holding coil of R–U–5.

When the carriage, at the beginning of OPERATION SECTION—D, contacted L–2, the electrical operation described in OPERATION SECTION—B was also carried out.

Operation section—D

Upon completion of electrical operational sequence described in OPERATION SECTION—B, further operation is as follows: As soon as the carriage 21 contacts L–1, the electrical operational sequence described in OPERATION SECTION—A will automatically begin.

Upon completion of electrical operation sequence, described in OPERATION SECTION—A and as soon as the carriage contacts L–2 the electrical operational sequence described in OPERATION SECTION—B will automatically begin.

Upon completion of electrical operational sequence described in OPERATION SECTION—B, and as soon as the carriage 21 contacts L–1, the electrical operational sequence as described in OPERATION SECTION—C will begin causing the hone carriage 21 to dwell.

In accordance with the aforementioned electrical operational sequences, as set forth to OPERATION SECTIONS (C&A), (B&D), (A), (B) in that order causes the carriage to dwell at the lower limit of its travel every other stroke, so as to allow the honing tool to blend in the shoulder caused by removing more material from the area of the cylinder that the honing tool previously dwelled in, than from the remaining areas. The machine will continue to operate in the above described manner indefinitely or until the operator selects a different stroke pattern.

If the operator manually opens S–7 the hone will dwell at the lower limits of its stroke travel every time the carriage contacts L–1.

The machine will perform as described in OPERATION SECTIONS C, A, and B and then repeat C, A and B. The machine will continue to operate in the above described manner indefinitely or until the operator selects another stroke pattern.

*Operation section—E*

If S–9 is depressed by the operator both of the driving clutches 118 and 120 will be disconnected from the automatic electric controls and the carriage will stop at that point in its travel and dwell until the operator releases S–9. This may be done at any time during any of the honing strokes. After the operator releases S–9 the automatic controls will resume operation.

*Operation section—F*

There are also means of the invention provided for selecting the number of times, within limits determined by builder's choice of components, that the carriage will dwell and then automatically revert back to a conventional stroke operation.

The following is an electrical operational sequence controlling the number of times the carriage will dwell.

S–1 is closed completing a circuit to S–2 and S–2 is thus closed completing a circuit to SEL–1.

As shown in FIG. 10, ST–1 has as many contacts as SEL–1. ST–1 is a stepping relay which will advance one position every time its actuating coil is energized. SEL–1 is a single pole twenty-four position wafer switch.

ST–1 is wired to SEL–1 in such a fashion as to have continuity between each other when they are both in the same numerical position. If SEL–1 is advanced one position continuity will be broken and will not be established again until ST–1 advances one position. ST–1's wiper is connected to ground.

When both ST–1 and SEL–1 are in the same numerical position, the holding coil of R–U–6 will be energized through S–1 and S–2. The machine will now perform as described in OPERATION SECTIONS A&B for an indefinite number of times.

If the operator should advance SEL–1 one position the holding coil of R–U–6 will be released which will allow the controls to function as described in OPERATION SECTION—C. During operation as described in OPERATION SECTION—C, T–D–R–1 will be energized which will close its normally open contacts No. 2 momentarily which will energize the coil ST–1 causing its wiper to advance one position re-establishing continuity to the holding coil of R–U–6 which will close the normally open contacts No. 2 of R–U–6 and will cause the machine to cease dwelling any further number of times and it will then perform as described in OPERATION SECTIONS A&B indefinitely. If the operator should select any number of positions on SEL–1, the machine hone will again begin to dwell on the lower end of its stroke, either every stroke or every other stroke, depending on the position of S–7. ST–1 will be advanced one position every time the machine carriage dwells until the wiper of ST–1 in the same numerical position as the wiper of SEL–1 which completes continuity to the holding coil of R–U–6 which will cause operation as described in OPERATION SECTIONS A&B to be brought into effect automatically.

In accordance with the foregoing sequences and accompanying schematic, the carriage can be caused to dwell at the lower limit of its travel, the dwelling thereof can be accomplished either every stroke or every other stroke, the duration of the dwell can readily be controlled, the carriage can be caused to dwell an indefinite number of times or a preselected number of times.

*Operation section—G*

There is also incorporated into the electrical circuits, provisions for the dwelling of the carriage 21 in selected areas of its travel so as to allow the honing tool 46 to remove more material from some areas of the cylinder than others, so as to be able to compensate for undesirable shapes in a cylinder such as tapered or barrel wear patterns in old cylinders or poor machining in new cylinders and it is to be understood that these or other shapes that can be accomplished through the dwelling of the hone can also be induced into the cylinder should they be desired.

The following describes an electrical operational sequence for dwell at the top of carriage stroke. S–4 is placed in open and S–1 is placed closed to ground while the carriage 21 is contacting L–1. Normally open contacts No. 1 of L–2 are thus closed energizing the holding coil of R–D–4 which closes the normally open contacts No. 3 of R–D–4 which completes a circuit through the normally closed contacts No. 2 of R–D–6 to the holding coil of R–D–2 and the time delay T–D–R–2 begins on energization. Normally open contacts No. 2 of R–D–2 have been closed to ground which energizes the holding coil of R–D–5. Normally open contacts No. 1 of R–D–5 are thus closed which completes a circuit through the normally closed contacts No. 1 of R–D–7 to ground so as to cause the normally open contacts No. 2 of R–D–2 to open at a later time.

Normally open contacts No. 1 of R–D–2 are closed keeping the holding coils of R–D–2 and T–D–R–2 energized even though L–2 may open due to vibration moving the carriage 21 slightly away from L–2 during the dwell operation.

After T–D–R–2 has completed its delay, the length of which can be readily set by operator, the normally open contacts No. 1 of T–D–R–2 will close momentarily which will energize the holding coil of R–D–3 which will open its normally closed contacts No. 1 which will break the circuit interlock of R–D–2 which will open the normally open contacts No. 2 of R–D–2 which has no effect at this time.

According to the foregoing, neither of the electrical clutches 118 or 120 have been engaged and consequently the carriage has remained at a standstill allowing the hone to remove material from a respective area of the cylinder.

After the energization of R–D–3, the electrical and mechanical equipment will perform as described in electrical operational sequence as described in OPERATION SECTION—B.

*Operation section—H*

After completion of OPERATION SECTION—B and with carriage contacting L–1, the following operation may occur. Normally open contacts No. 1 of L–1 have closed which will energize the holding coil of R–U–4 which will close the normally open contacts No. 2 of R–U–4 to ground thereby completing the circuit through the normally open contacts No. 2 of R–D–5 which have been closed by a previous operation which will energize the holding coil of R–D–6 which will close the normally open contacts No. 3 of R–D–6 which will lock the holding coil of R–D–6 through the normally closed contacts No. 3 of R–D–3.

Contacts No. 1 of R–D–6 have been thus closed which will energize the holding coil of R–D–7 which will open the normally closed contacts No. 1 of R–D–7 which will release the holding coil of R–D–5.

When the carriage 21 contacted L–1 as described at the beginning of OPERATION SECTION—H, the electrical operation described in OPERATION SECTION—A was also carried out.

Upon completion of electrical operational sequence described in OPERATION SECTION—A, further operation may be as follows: As soon as the carriage contacts L–2 the electrical operational sequence described in OPERATION SECTION—B will automatically begin.

Upon completion of electrical operational sequence as described in OPERATION SECTION—B and as soon as the carriage contacts L–2 the electrical operational sequence described in OPERATION SECTION—A will automatically begin.

Upon completion of electrical operational sequence as described in OPERATION SECTION—A and as soon as the carriage contacts L–2 electrical operational sequence described in OPERATION SECTION—G will begin causing the hone carriage to dwell.

In accordance with the aforementioned electrical operational sequences, as described in OPERATION SECTIONS G and B, A and H, B, and A in that order, the carriage has been caused to dwell at the lower limit of its travel every other stroke so as to allow the honing tool to blend in the shoulder caused by removing more material from the area of the cylinder that the honing tool dwelled in, than from the remaining areas. The machine will continue to operate in the above described manner indefinitely or until the operator selects a different stroke pattern.

If the operator manually opens S–8 the machine will dwell at the upper limits of its travel every time the carriage contacts L–2. The following is a list of electrical operational sequences the machine will perform.

The functions as described in OPERATION SECTIONS G, B and A and then repeat G, B and A. The machine will continue to operate in the above described manner indefinitely or until the operator selects another stroke pattern.

*Operation section—I*

If S–9 is depressed by the operator both of the driving clutches 118 and 120 will be disconnected from the automatic electric controls and the carriage will stop at a respective location in its travel and dwell there until the operator releases S–9.

This may be done at any time during any of the honing strokes. After the operator releases S–9 the automatic controls will resume operation.

*Operation section—J*

There are also means of the invention, provided for selecting the number of times, within limits determined by builder's choice of components, that the carriage will dwell, and then automatically revert back to conventional stroke operation.

The following is an electrical operational sequence controlling the number of times the hone will dwell on the upper stroke. S–4 may be closed completing a circuit to S–3 and S–3 may be closed completing a circuit to SEL–2.

According to FIGURES 10 and 11 ST–2 has as many contacts as SEL–2. ST–2 is a stepping relay which will advance one position every time its actuating coil is energized. SEL–2 is a single pole twenty-four position wafer switch.

ST–2 is wired to SEL–2 in such a fashion as to have continuity between each other when they are both in the same numerical position. If SEL–2 is advanced one position, continuity will be broken and will not be established again until ST–2 advances one position. ST–2's wiper is connected to ground.

When both ST–2 and SEL–2 are in the same numerical position, the holding coil of R–D–6 will be energized through S–3 and S–4. The machine will now perform, as described in OPERATION SECTIONS A and B for an indefinite number of times.

If the operator should advance SEL–2 one position, the holding coil of R–D–6 will be released which will allow the controls to function, as described in OPERATION SECTION—G. During this sequence T–D–R–2 will be energized, which will close the normally open contacts No. 2 thereof momentarily, which will energize the coil of ST–2 causing its wiper to advance one position re-establishing continuity to the holding coil of R–D–6 which will close the normally open contacts No. 2 of R–D–6, which will cause the machine to cease dwelling any further number of times, and it will now perform the sequence described in OPERATION SECTIONS A and B indefinitely. If the operator should select any number of positions of SEL–2, the machine will again begin to dwell on the lower end of its limit of travel. Either every stroke or every other stroke, depending on the position of S–8, ST–2 will be advanced one position every time the machine dwells until the wiper of S–2 is in the same numerical position as the wiper of SEL–2, which completes continuity to the holding coil of R–D–6, which will cause the sequence described in OPERATION SECTION B, to be brought into effect automatically.

As shown in FIGS. 10 and 11, continuity of the schematic disclosure is established by reference characters 220, 222, 224, 226, 228, 230, 232, 233, 234, 236, 238, 240 and 242.

It will be obvious to those skilled in the art that various modifications of the present invention may be resorted to in a manner limited only by a just interpretation of the following claims.

I claim:
1. In a honing machine, the combination of: a frame; a work holder mounted thereon; a carriage reciprocally movably mounted to move back and forth on said frame relative to said work holder; a power driven honing tool mounted on said carriage; reversible reciprocating means disposed to move said carriage in a back and forth stroke relative to said frame; powered drive means having a pair of oppositely rotating shafts; a pair of clutches alternately disposed to couple each of said shafts to said reciprocating means; and first and second means supported by said frame and operable by said carriage at opposite ends of its reciprocating stroke, said first and second means each coupled to one of said pair of clutches for initiating and controlling intermittent operation thereof.

2. The invention, as defined in claim 1, wherein: said clutches are provided with electro-magnetic operating means, said first and second means being electrically conducting limit switches.

3. The invention, as defined in claim 2, wherein: said limit switches are adjustably mounted on said frame to permit adjustment of the length of stroke of said carriage.

4. The invention, as defined in claim 2, wherein: electronic time delay means in circuit with said switches and said electro-magnetic operating means is adapted to cause a dwell period in the stroke movement of said carriage at various locations relative to the carriage stroke.

5. The invention, as defined in claim 4, wherein: means is provided for adjusting said time delay means to vary the length of said dwell period.

6. The invention, as defined in claim 4, wherein: said electronic time delay means comprises elements independently operable with respect to each of said limit switches and respective opposite stroke movements and dwells therein.

7. In a machine the combination of a frame; a carriage reciprocally mounted to move back and forth on said frame; reversible reciprocating means disposed to move said carriage in a back and forth stroke relative to said frame; powered drive means having a pair of oppositely rotating shafts; a pair of clutches alternately disposed to couple each of said shafts to said reciprocating means and first and second means supported by said frame and operable by said carriage at opposite ends of said reciprocating stroke, said first and second means each coupled to one of said pair of clutches for initiating and controlling intermittent operation thereof.

8. The invention, as defined in claim 1, wherein: said reversible reciprocating means comprises spaced sprockets; endless chain means surrounding said spaced sprockets; and means connecting said endless chain means to said carriage.

9. In a machine tool the combination of: a frame; a work holder mounted thereon; a tool carriage reciprocally mounted to move back and forth on said frame relative to said work holder; a power driven tool mounted on said carriage; reversible reciprocating means disposed to move said carriage in a back and forth stroke relative to said frame; powered drive means having a pair of oppositely rotating shafts; a pair of clutches alternately disposed to couple each of said shafts to said reciprocating means; and first and second means supported by said frame and operable by said carriage at opposite ends of its reciprocating stroke; said first and second means each coupled to one of said pair of clutches for initiating and controlling intermittent operation thereof.

10. The invention, as defined in claim 2, wherein: said reversible reciprocating means comprises spaced sprockets; and endless chain surrounding said spaced sprockets, said endless chain means coupled to said carriage.

11. The invention, as defined in claim 1, wherein: time delay means is coupled to said first and second means for causing a dwell in the stroke of said carriage and wherein variable speed control means is provided for controlling the speed of said power driven honing tool.

12. The invention, as defined in claim 2, wherein: said power driven honing tool is provided with an electric motor; indicator means in circuit with said motor adapted to indicate minimum and maximum work load imposed by said honing tool on said motor with respect to various stroke positions of said carriage.

References Cited

UNITED STATES PATENTS

| | | | |
|---|---|---|---|
| 1,732,560 | 10/1929 | Johnson | 51—34 |
| 3,126,672 | 3/1964 | Calvert et al. | 51—34 |
| 2,195,052 | 3/1940 | Wallace | 51—92 X |
| 3,133,455 | 5/1964 | White | 74—220 X |

JAMES L. JONES, JR., *Primary Examiner.*

U.S. Cl. X.R.

51—254; 74—220